United States Patent
Chen (10) Patent No.: US 12,196,657 B2
(45) Date of Patent: Jan. 14, 2025

(54) ISOLATION DEVICE AND ISOLATION METHOD

(71) Applicant: Shenzhen Huixin Life Technologies Co., Ltd, Shenzhen (CN)

(72) Inventor: Yu-Chao Chen, Shenzhen (CN)

(73) Assignee: Shenzhen Huixin Life Technologies Co., Ltd, Shenzhen (CN)

( * ) Notice: Subject to any disclaimer, the term of this patent is extended or adjusted under 35 U.S.C. 154(b) by 815 days.

(21) Appl. No.: 17/369,836

(22) Filed: Jul. 7, 2021

(65) Prior Publication Data
US 2022/0146384 A1  May 12, 2022

Related U.S. Application Data

(63) Continuation-in-part of application No. PCT/CN2020/128177, filed on Nov. 11, 2020.

(51) Int. Cl.
*G01N 1/40* (2006.01)
*B01D 65/08* (2006.01)

(52) U.S. Cl.
CPC ............ *G01N 1/4077* (2013.01); *B01D 65/08* (2013.01); *B01D 2321/04* (2013.01);
(Continued)

(58) Field of Classification Search
CPC ......... G01N 1/4077; G01N 2001/4088; G01N 2001/4016; G01N 1/34; G01N 1/4005;
(Continued)

(56) References Cited

U.S. PATENT DOCUMENTS

| | | |
|---|---|---|
| 2012/0000851 A1 | 1/2012 | Vuong et al. |
| 2017/0216776 A1 | 8/2017 | Liberman et al. |
| 2019/0160433 A1* | 5/2019 | Chen ................. B01D 61/20 |

FOREIGN PATENT DOCUMENTS

| | | |
|---|---|---|
| CN | 108126522 A | 6/2018 |
| CN | 207478341 U | 6/2018 |
| CN | 109439533 A | 3/2019 |
| CN | 211784638 U | 10/2020 |

(Continued)

OTHER PUBLICATIONS

Maskooki Abdolmajid et al: "Effects of various frequencies and powers of ultrasound on cleaning of flat sheet membrane during and after microfiltration", vol. 57, No. 12, Jan. 26, 2015, pp. 5376-5384, XP 093125091, UK ISSN: 1944-3994, DOI: 10.1080/19443994.2014.1003978*Section 1.

*Primary Examiner* — Jill A Warden
*Assistant Examiner* — Dwayne K Handy
(74) *Attorney, Agent, or Firm* — ScienBiziP, P.C.

(57) ABSTRACT

An isolation device includes an isolation chip assembly, a vacuum system, a frequency converting module, and a controller. The isolation chip assembly includes an isolation chip having a first chamber and a second chamber, a first oscillator mounted on the first chamber, and a second oscillator mounted on the second chamber. The frequency converting module causes the vacuum system to generate negative pressure in the first and the second chambers alternately. The controller controls the first and the second oscillators to operate when the vacuum system stops generating the negative pressure in the first chamber and in the second chamber. The first and the second oscillators respectively generate a first and a second oscillation wave when operating, a frequency of the first oscillation wave is greater than a frequency of the oscillation wave, an amplitude of the first oscillation wave is less than an amplitude of the second oscillation wave.

10 Claims, 6 Drawing Sheets

(52) U.S. Cl.
CPC .. *B01D 2321/2083* (2013.01); *B01D 2321/26* (2013.01); *B01D 2321/30* (2013.01); *B01D 2321/40* (2013.01); *G01N 2001/4088* (2013.01)

(58) Field of Classification Search
CPC ............... B01D 65/08; B01D 2321/04; B01D 2321/2083; B01D 2321/26; B01D 2321/30; B01D 2321/40; B01D 2321/20; B01D 61/18; B01D 63/16; B01D 65/02; B01D 2321/2058; B01D 2321/2075
See application file for complete search history.

(56) References Cited

FOREIGN PATENT DOCUMENTS

| | | |
|---|---|---|
| JP | 2020-062601 A | 4/2020 |
| KR | 102101082 B1 | 4/2020 |
| WO | 9902238 | 1/1999 |
| WO | 2015/198080 A1 | 12/2015 |
| WO | 2020/202200 A1 | 10/2020 |

\* cited by examiner

ISOLATION DEVICE AND ISOLATION METHOD

CROSS REFERENCE TO THE RELATED APPLICATIONS

This application is a continuation under 35 U.S.C. § 120 of international patent application PCT/CN2020/128177 filed on Nov. 11, 2020.

FIELD

The subject matter herein generally relates to biotechnology, and more particularly, to an isolation device and an isolation method.

BACKGROUND

A biopsy of human liquid, such as urine, saliva, pleural effusion, and cerebrospinal liquid, is the sampling and analysis of the bioliquid. With isolation and study of specific biomarkers in the bioliquid, liquid biopsy can be used as a diagnostic and monitoring tool for diseases such as cancer, with the added benefit of being largely non-invasive. The specific biomarkers in the bioliquid include circulating tumor DNA (ctDNA), circulating tumor cells (CTCs), and microvesicles (i.e. exosomes). The study of exosomes is helpful to obtain information from different perspectives, and thus improve the precision of liquid biopsy.

The existing approaches to isolation and purification of exosomes include filtering by a filtration membrane. However, clogging of the filtration membrane usually happens during filtration, which can decrease the isolation efficiency and purity of exosomes. Therefore, there is room for improvement in the art.

BRIEF DESCRIPTION OF THE DRAWINGS

Implementations of the present disclosure will now be described, by way of embodiments only, with reference to the attached figures.

DETAILED DESCRIPTION

It will be appreciated that for simplicity and clarity of illustration, where appropriate, reference numerals have been repeated among the different figures to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 1:
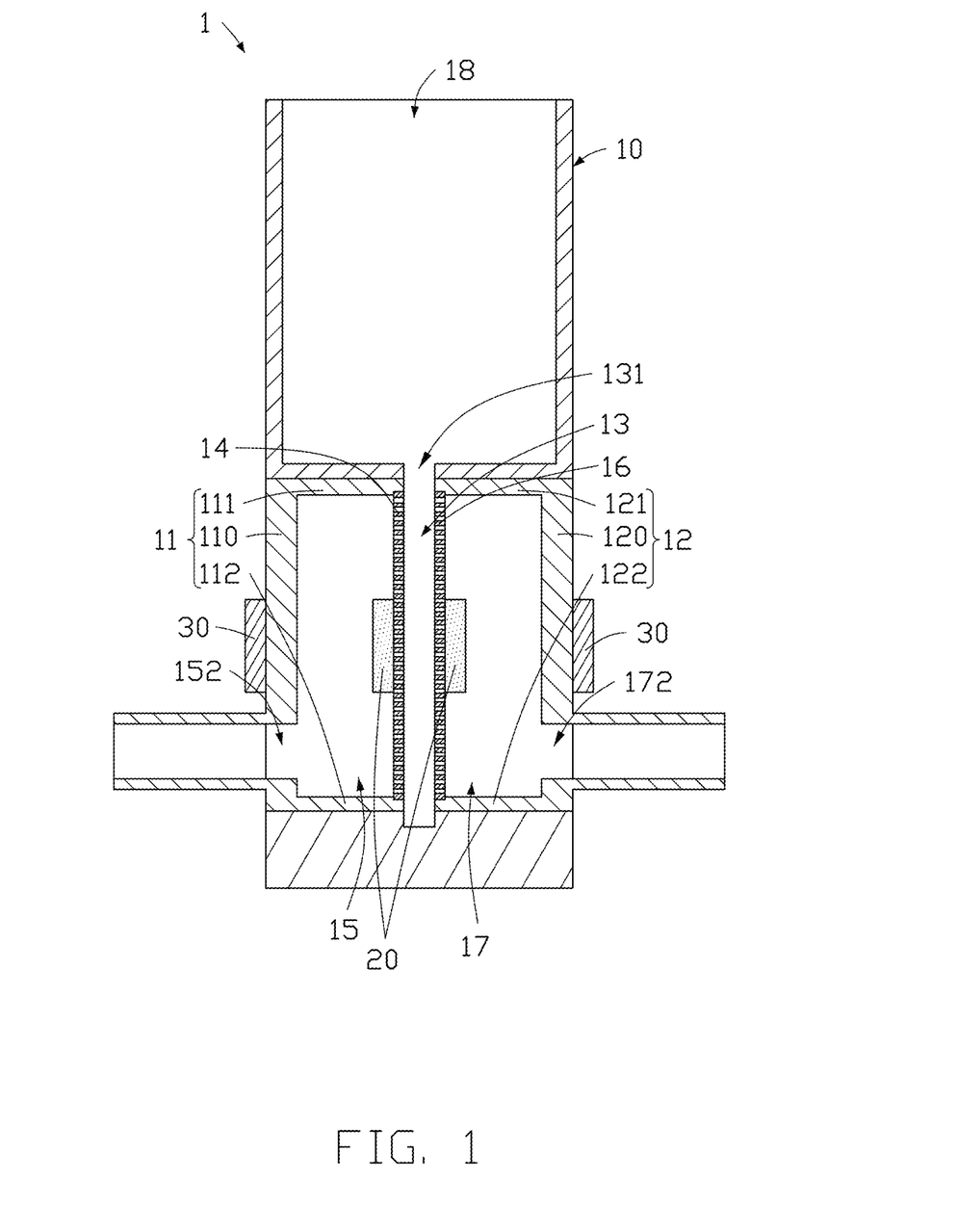
FIG. 1 is a diagrammatic view of an embodiment of an isolation chip assembly according to the present disclosure.

FIG. 1 illustrates an embodiment of an isolation chip assembly 1 adapted for isolation and purification of target particles from a liquid sample. The liquid sample can be a bioliquid such as plasma, serum, saliva, urine, and lavage. The target particles can be biological cells such as circulating tumor cells (CTCs) or exosomes. The isolation chip assembly 1 includes an isolation chip 10, a first oscillator 20, and a second oscillator 30.

The isolation chip 10 includes a sample reservoir 13, a first filtration membrane 14, and a second filtration membrane 16. The sizes of the pores of the filtration membrane 14 and the pores of the second filtration membrane 16 are smaller than the size of the target particles.

The isolation chip 10 further includes a first chamber 15, a second chamber 17. The first chamber 15 is connected to the sample reservoir 13 by the first filtration membrane 14. The first chamber 15 includes a first outlet 152 that connects the first chamber 15 to an ambient environment. The second chamber 17 is connected to the sample reservoir 13 by the second filtration membrane 16. The second chamber 17 includes a second outlet 172 that connects the second chamber 17 to the ambient environment. The first chamber 15 and the second chamber 17 can be positioned at opposite sides of the sample reservoir 13.

In use, the liquid sample is added to the sample reservoir 13. Each of the first outlet 152 and the second outlet 172 is connected to a vacuum system 50 (shown in FIG. 4). When the vacuum system 50 generates negative pressure in the first chamber 15 through the first outlet 152, compositions in the liquid sample that are smaller than the pores of the first filtration membrane 14 can enter the first chamber 15 through the first filtration membrane 14. When the vacuum system 50 generates negative pressure in the second chamber 17 through the second outlet 172, compositions in the liquid sample that are smaller than the pores of the second filtration membrane 16 can enter the second chamber 17 through the second filtration membrane 16. At the same time, the back flow of the liquid sample adjacent to the first filtration membrane 14 prevents any composition from accumulating in the pores of the first filtration membrane 14. Thus, clogging of the first filtration membrane 14 can be avoided. Since the negative pressure is alternately applied in the first chamber 15 and the second chamber 17, the compositions in the liquid sample can alternately flow through the first filtration membrane 14 and the second filtration membrane 16. This leaves the target particles that are larger than the pores of the first filtration membrane 14 and the second filtration membrane 16 (that is, the target particles) in the sample reservoir 13.

Figure 2:
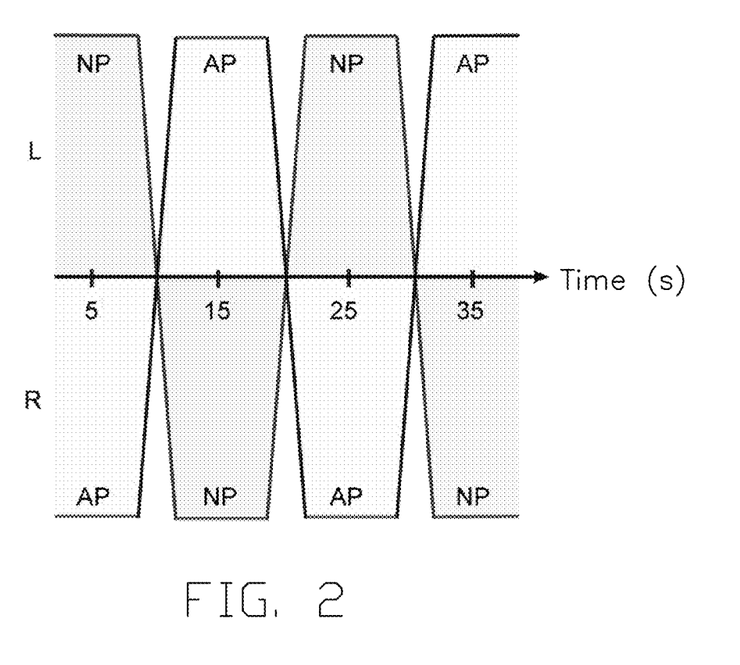
FIG. 2 is a diagrammatic view showing negative pressure applied on the isolation chip assembly of FIG. 1.

Referring to FIG. 2, in an embodiment, the negative pressure (NP) alternating between the first chamber 15 and the second chamber 17 is caused by rectangular wave shaped pulse signals. The rectangular wave shaped pulse signals have an amplitude of 10 $V_{pp}$, and a frequency of 5000 Hz to 7000 Hz. Since a high protein concentration is included in a plasma sample, to further avoid the clogging of the filtration membranes, an air pressure (AP) can be applied to one chamber when the negative pressure is applied to the other chamber, thereby improving the back flow at the filtration membranes.

Referring to FIG. 1, two first oscillators 20 are included. One of the first oscillators 20 is mounted on a surface of the first filtration membrane 14 away from the second filtration membrane 16. The other one of the first oscillators 20 is mounted on a surface of the second filtration membrane 16 away from the first filtration membrane 14. The first oscillators 20 can generate a first horizontal oscillation wave when operating, and then transmit the first oscillation wave to the first filtration membrane 14 and the second filtration membrane 16 to drive the first filtration membrane 14 and the second filtration membrane 16 to vibrate at high frequency. Therefore, the target particles adsorbed in the pores of the filtration membranes can be quickly separated from the pores of the filtration membranes and resuspended in the liquid sample, thereby further avoiding the clogging of the filtration membranes and obtaining an efficient isolation.

Figure 3:
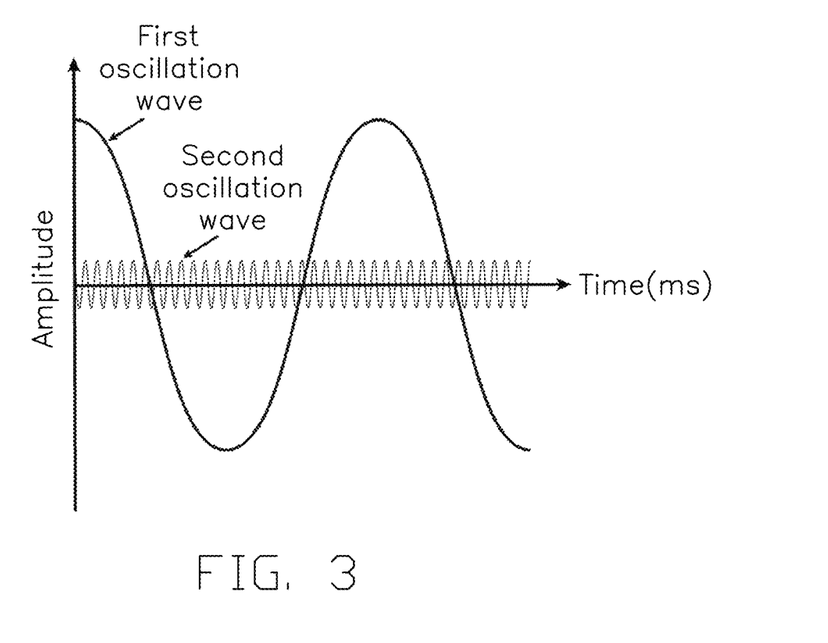
FIG. 3 is a diagrammatic view showing a first oscillation wave and a second oscillation wave applied to the isolation chip of FIG. 1.

Two second oscillators 30 are included. One of the second oscillators 30 is mounted on an outer surface of the first chamber 15. The other one of the second oscillators 30 is mounted on an outer surface of the second chamber 17. The second oscillators 30 can generate a second horizontal oscillation wave when operating. Referring to FIG. 3, the frequency of the first oscillation wave is greater than the frequency of the oscillation wave, but the amplitude of the first oscillation wave is less than the amplitude of the second oscillation wave. The second oscillation wave is transmitted to the whole isolation chip 10 through the first chamber 15 and the second chamber 17, thus the isolation chip 10 can vibrate at low frequency. The first oscillation wave and the second oscillation wave can cooperatively disturb the liquid sample and the filtration membranes to generate an acoustic streaming, which prevents the target particles from clogging the pores or from gathering together, and improves the isolation and purification efficiency. In at least one embodiment, the first oscillator 20 may be a harmonic oscillator, and the second oscillator 30 may be a vibrating motor.

In at least one embodiment, the frequency of the first oscillation wave is 5000 Hz to 8000 Hz. The frequency of the second oscillation wave is 100 Hz to 500 Hz. Neither the first oscillation wave nor the second oscillation wave at this frequency will cause damages to the target particles. In at least one embodiment, the frequency of the first oscillation wave can be approximately the same as the resonance frequency of the first filtration membrane 14 or the second filtration membrane 16. Thus, the first filtration membrane 14 or the second filtration membrane 16 can vibrate with a larger amplitude, thereby causing the target particles adsorbed on the filtration membranes to be separated from the filtration membranes more quickly.

In at least one embodiment, the first oscillators 20 and the second oscillators 30 are located on a same horizontal plane. That is, the first oscillation wave and the second oscillation wave are towards a same direction, so that the first oscillation wave and the oscillation vibration wave can be superimposed on each other to form a coordinated oscillation wave.

In at least one embodiment, the isolation chip 10 further includes a first side cover 11 and a second side cover 12. The first side cover 11 includes a first cover body 110, and a first barrier sheet 111 and a second barrier sheet 112 located on opposite sides of the first cover body 110. The first filtration membrane 14 is fixed between the first barrier sheet 111 and the second barrier sheet 112, and faces the first cover body 110. The first cover body 110, the first barrier sheet 111, the second barrier sheet 112 and the first filtration membrane 14 cooperatively define the first chamber 15. The second side cover 12 includes a second cover body 120, and a third barrier sheet 121 and a fourth barrier sheet 122 located on opposite sides of the second cover body 120. The third barrier sheet 121 faces the first barrier sheet 111. The fourth barrier sheet 122 faces the second barrier sheet 112. The second filtration membrane 16 is fixed between the third barrier sheet 121 and the fourth barrier sheet 122, and faces the second cover body 120. The second cover body 120, the third barrier sheet 121, the fourth barrier sheet 122 and the second filtration membrane 16 cooperatively define the second chamber 17. The sample reservoir 13 is disposed between the first filtration membrane 14 and the second filtration membrane 16. The second oscillator 30 is fixed to an outer surface of the first cover body 110 or the second cover body 120.

Furthermore, the first barrier sheet 111 and the third barrier sheet 121 are spaced from each other to define a sample injection inlet 131 that communicates with the sample reservoir 13. The isolation chip 10 further includes a sample adding chamber 18, that communicates with the sample reservoir 13 through the sample injection inlet 131. During use, the liquid sample is added to the sample adding chamber 18, and the sample injection inlet 131 allows the liquid sample in the sample adding chamber 18 to flow out and enter the sample reservoir 13.

Figure 6:
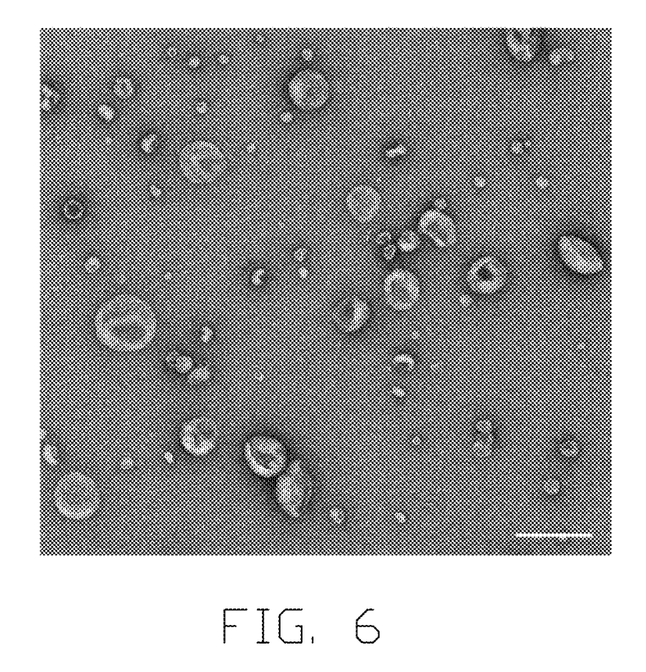
FIG. 6 is a scanning electron micrograph (SEM) of exosomes obtained by Example of the present disclosure.

FIG. 6 illustrates an embodiment of an isolation device 100 including the isolation chip assembly 1, a vacuum system 50, a frequency converting module 40, and a controller 60.

Figure 4:
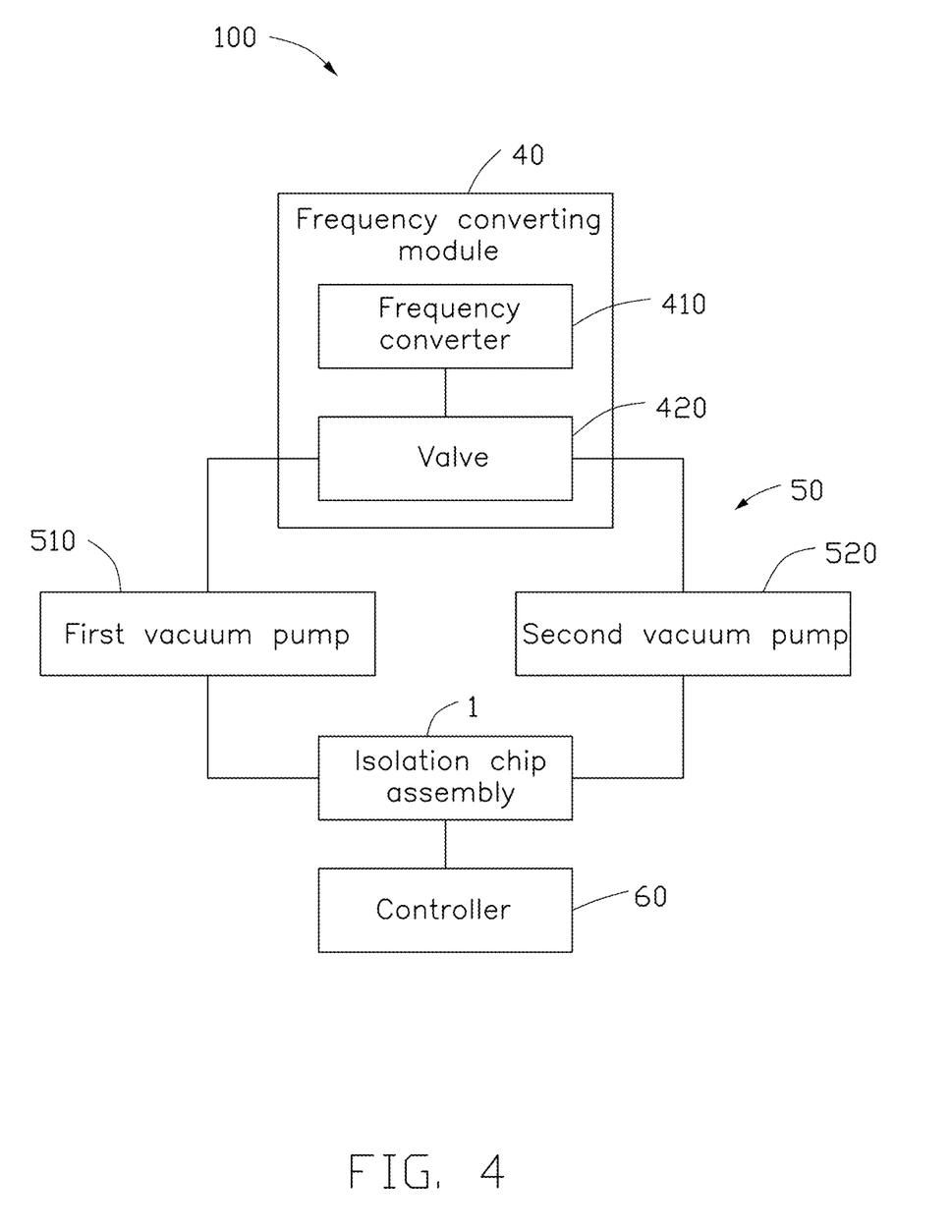
FIG. 4 is a block diagram of an embodiment of an isolation device according to the present disclosure.

The vacuum system 50 generates the negative pressure in the first chamber 15 and the second chamber 17 of the isolation chip assembly 1 alternately. In at least one embodiment, the vacuum system 50 includes a first vacuum pump 510 and a second vacuum pump 520. The first vacuum pump 510 is connected to the first outlet 152 of the isolation chip 10. The second vacuum pump 520 is connected to the second outlet 172 of the isolation chip assembly 1.

The frequency converting module 40 is electrically connected to the vacuum system 50, and provides electric power to the vacuum system 50. In an embodiment, the frequency converting module 40 includes a frequency converter 410 and a valve 420 connected to the frequency converter 410. The valve 420 can be an electromagnetic valve or a rotary valve. The valve 420 is alternately switched to connect one of the first vacuum pump 310 and the second vacuum pump 320, to cause the vacuum system 50 to alternately apply the negative pressure in the first chamber 15 and the second chamber 17. That is, when the valve 420 connects to the first vacuum pump 310, the frequency converter 410 controls the first vacuum pump 310 to generate negative pressure in the first chamber 15. The compositions that have sizes smaller than the size of the pores of the first filtration membrane 14 can pass through the first filtration membrane 14 under the negative pressure. Then, the frequency converter 410 controls the first vacuum pump 310 to stop operating, and the valve 420 is switched to connect to the second vacuum pump 320. The frequency converter 410 controls the second vacuum pump 320 to apply the negative pressure in the second chamber 17. The compositions that have sizes smaller than the size of the pores of the second filtration membrane 16 can pass through the second filtration membrane 16 under the negative pressure. Then, the frequency converter 410 controls the second vacuum pump 320 to stop operating. The above procedures are repeated until complete isolation is achieved.

The collector 60 controls the first oscillator 20 and the second oscillator 30 to operate when the first chamber 15 is stopped evacuated. Thus, the first oscillation wave and the second oscillation wave are generated. The controller 60 further controls the first oscillator 20 and the second oscillator 30 to operate when the second chamber 17 is stopped evacuated. The controller 60 can be electrically connected to the first vacuum pump 510 and the second vacuum pump 520. When the first vacuum pump 510 or the second vacuum pump 520 stops operating, the controller 60 determines that the first vacuum pump 510 stops evacuating the first chamber 15 or the second vacuum pump 520 stops evacuating the second chamber 17. Then, the controller 60 informs the first oscillator 20 and the second oscillator 30 to start operating.

An embodiment of an isolation method of target particles from a liquid sample is also provided. The method is provided by way of embodiment, as there are a variety of ways to carry out the method. The method can begin at step S1.

S1, the isolation chip assembly 1 is provided, and the liquid sample is added to the sample reservoir 13 of the isolation chip assembly 1.

S2, the first chamber 15 is evacuated through the first outlet 152 to generate the negative pressure in the first chamber 15.

In at least one embodiment, before evacuating the first chamber 15, the first outlet 152 and the second outlet 172 are connected to the vacuum system 50. Then, the vacuum system 50 evacuates the first chamber 15 through the first chamber 15, to cause the compositions having sizes that are smaller than sizes of the pores of the first filtration membrane 14 to enter the first chamber 15 through the first filtration membrane 14.

S3, vacuuming of the first chamber 15 is stopped, and the first oscillator 20 and the second oscillator 30 operate to generate the first oscillation wave and the second oscillation wave. At the same time, the second chamber 17 is evacuated through the second outlet 172 to generate the negative pressure in the second chamber 17.

The first oscillation wave drives the first filtration membrane 14 to vibrate at a high frequency. Therefore, the target particles adsorbed in the pores of the filtration membrane can be quickly separated from the pores of the filtration membranes and resuspended in the liquid sample. The second chamber 17 can prevent the target particles from gathering together. At the same time, since the negative pressure is generated in the second chamber 17, the compositions adhered on the first filtration membrane 14, which have sizes smaller than the size of the pores of the second filtration membrane 16, can return to the sample reservoir 13 together with the flows of the fluid, and further move towards the second chamber 17 through the second filtration membrane 16.

S4, vacuuming of the second chamber 17 is stopped, and the first oscillator 20 and the second oscillator 30 operate.

Example

The exosomes are isolated and purified from a urine sample of 2 mL by the isolation chip assembly of the present disclosure. The frequency of the first oscillator is 6250 Hz (approximately the same as the resonance frequency of the filtration membrane), and the frequency of the second oscillator is 200 Hz.

Comparative Example 1

Different from Example 1, the exosomes are isolated and purified from a urine sample of 2 mL by the isolation chip. The first oscillator and the second oscillator are not included in the isolation chip.

Comparative Example 2

Different from Example 1, the exosomes are isolated and purified from a urine sample of 2 mL by the isolation chip. The first oscillator is not included in the isolation chip.

Comparative Example 3

Different from Example 1, the exosomes are isolated and purified from a urine sample of 2 mL by the isolation chip. The second oscillator is not included in the isolation chip.

Comparative Example 4

The exosomes are isolated and purified from a urine sample of 2 mL by dead-end filtration. The dead-end filtration uses the same filtration membrane as the isolation chip, but the liquid sample is placed upstream of the filtration membrane. Under the function of pressure difference, components that have sizes smaller than the size of the pores of the filtration membrane are allowed to pass through the filtration membrane.

Figure 5:
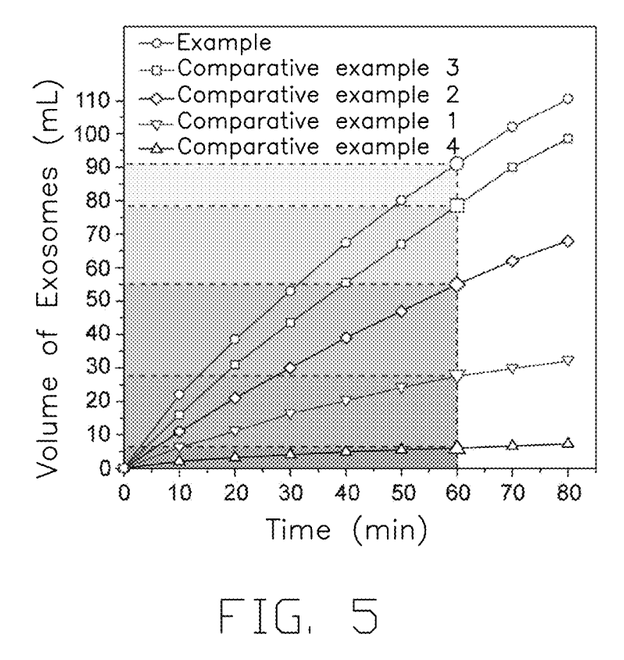
FIG. 5 is a relationship between volumes of exosomes obtained by Examples and Comparative examples 1-4 and purification times.

The concentrations of exosomes obtained in Example and Comparative Examples 1-4 are measured, and the results are recorded in FIG. 5. As shown in FIG. 5, the exosomes of nearly 30 μm can be isolated from the liquid sample within 10 minutes in Example, and the isolation efficiency is much higher than that in the Comparative examples 1-4. The exosomes obtained in the Example are further subjected to a transmission electron microscope test, and the test result is shown in FIG. 6 (the scale is 250 nm). FIG. 6 shows that the exosomes have a particle size of 50 nm to 200 nm, which is consistent with the theoretical size of the exosomes. The exosomes are round or cup-shaped, which have a high integrity.

Figure 7:
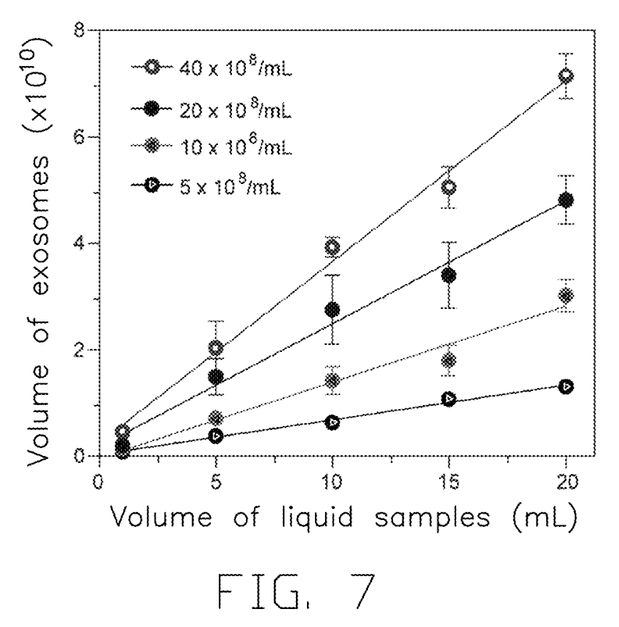
FIG. 7 is a diagram of concentrations of exosomes obtained from urine samples of different volumes and concentrations of exosomes.

Furthermore, the same separation chip assembly is used to repeat the isolation and purification of exosomes from four urine samples. The four urine samples have different concentrations of exosome. Each of the four urine samples has a volume of 1 mL to 20 mL. Then, an ultraviolet-visible spectrophotometer is used to test the concentrations of proteins in the exosomes, and the results are recorded in FIG. 7. As shown in FIG. 7, the concentrations of exosomes linearly increase with the increase of the volume of the urine samples, indicating that when the liquid samples having different volumes or when the liquid samples having exosomes with different concentrations are tested, the isolation chip assembly has a high structural stability during the isolation and the purification of the exosomes. In addition, the same isolation chip assembly is repeatedly used for the isolation and the purification of the exosomes from a urine sample of 10 mL. After twenty times, the coefficient of variation (CV) between the concentrations of exosomes is less than 9.9%, indicating that the isolation chip assembly has a high repeatability during the isolation and the purification of the exosomes.

Figure 8:
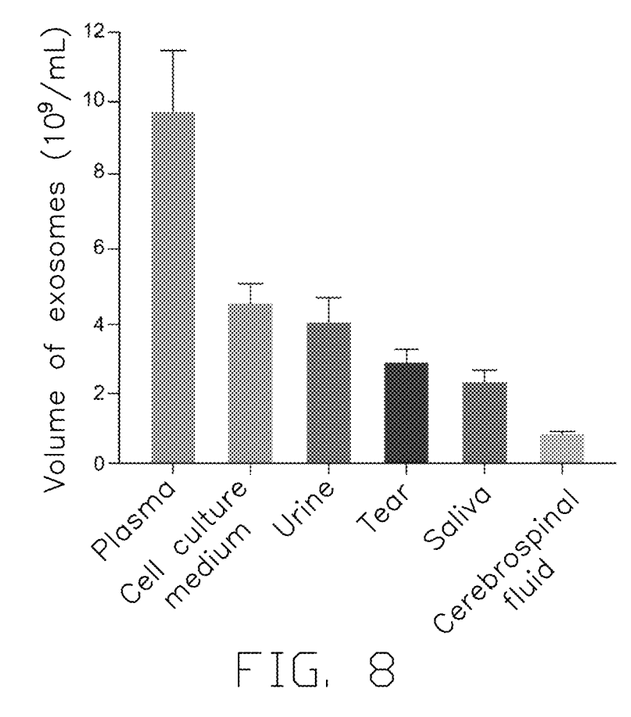
FIG. 8 is a diagram of concentrations of exosomes obtained from different types of liquid samples.

Furthermore, the isolation chip assembly is also used to isolate and purify exosomes from other liquid samples, including plasma, cell culture medium, tear, saliva, and cerebrospinal fluid (CSF). As shown in FIG. 8, higher concentrations of exosomes are obtained from these liquid samples, indicating that the isolation chip assembly is suitable for the isolation and the purification of exosomes from various liquid samples. Moreover, the size of the exosomes is also in the range of 50 nm to 200 nm.

Comparative Example 5

Existing isolation and the purification methods, such as ultracentrifugation (UC), polyethylene glycol (PEG) precipitation, phosphatidylserine (PS) affinity, size exclusion chromatography (SEC), membrane affinity (MA), are used to isolate exosomes from the same urine sample.

Figure 9:
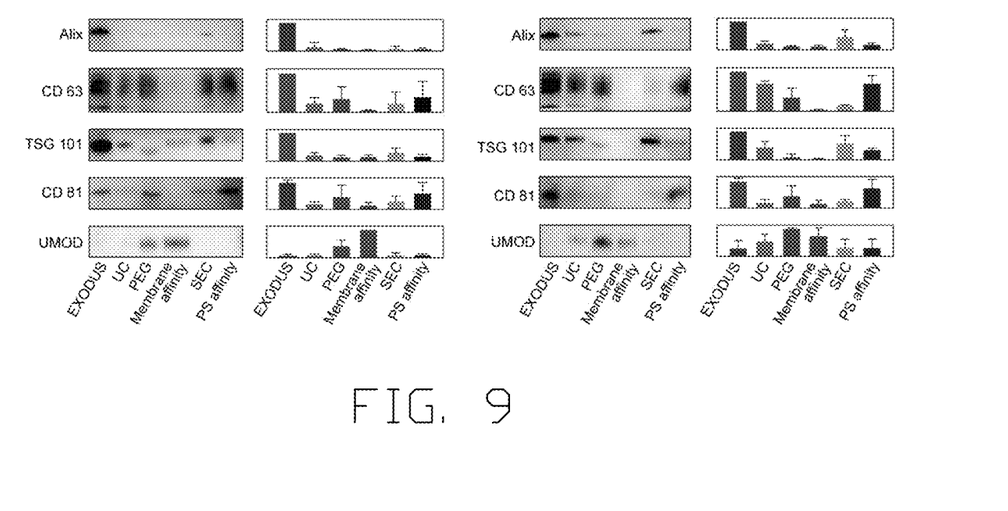
FIG. 9 is Western blot analysis of exosomes obtain by Example and Comparative example 5.

Western blotting is used to test protein markers including ALIX, CD63, TSG101, and CD81 in the exosomes obtained by Example and Comparative example 5. Uromodulin (UMOD) is a protein with a highest concentration in the urine samples, which can be used to characterize the purity of the exosomes. As shown in FIG. 9, compared with the exosomes isolated by the existing isolation and purification methods, four protein markers can be detected in the exosomes isolated and purified by the isolation chip assembly (denoted as EXODUS in FIG. 9), indicating that the purification yield is high. The exosomes do not adsorb a large amount of uromodulin, indicating that the purification accuracy is high.

Figure 10:
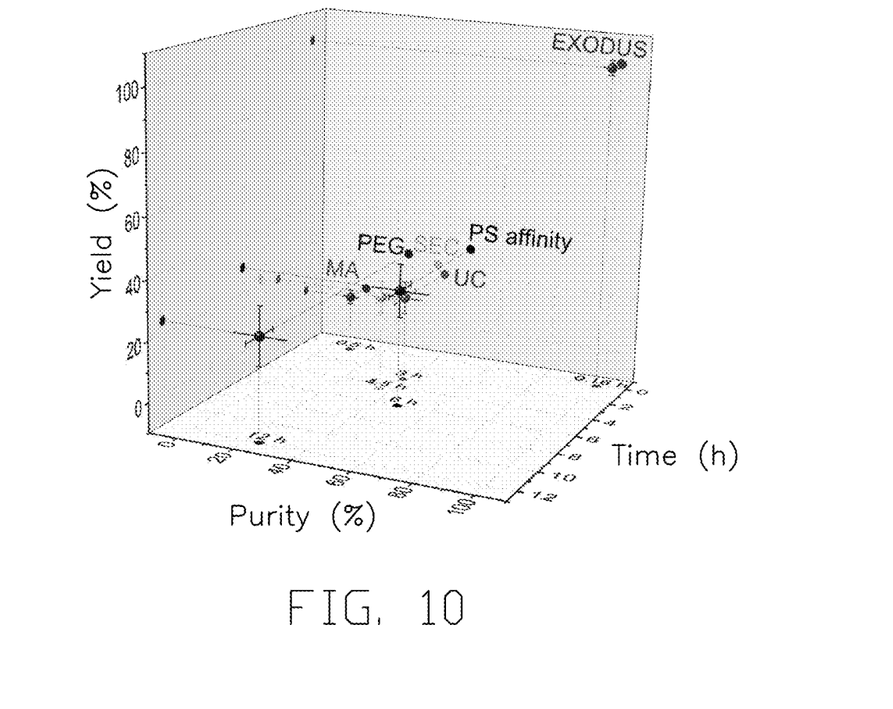
FIG. 10 is a diagram showing a comparison between Example 5 and Comparative Example 5 in three dimensions including purification time, exosomes yield, and purity of exosomes.

The purification time, the exosomes yield, and the purity of exosomes are three dimensions to characterize different isolation and the purification methods. As shown in FIG. 10, compared to the existing isolation and the purification methods in Comparative Example 5, the isolation chip assembly (denoted as EXODUS in FIG. 10) requires a shorter purification time (reduced by 95%), a higher exosomes yield (increased by 526%) and a higher purity of exosomes (increased by 259%), indicating that the isolation chip assembly is more competitive than the existing isolation and the purification methods.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. An isolation device for isolation and purification of target particles from a liquid sample, comprising:
   an isolation chip assembly, comprising:
      an isolation chip comprising a sample reservoir, and a first filtration membrane and a second filtration membrane disposed at opposite sides of the sample reservoir, sizes of pores of each of the first filtration membrane and the second filtration membrane being smaller than sizes of the target particles, the isolation chip further comprising a first chamber and a second chamber, the first chamber connected to the sample reservoir through the first filtration membrane, the second chamber connected to the sample reservoir through the second filtration membrane;
      two first oscillators, one of the two first oscillators mounted on a surface of the first filtration membrane away from the second filtration membrane, another one of the two first oscillators mounted on a surface of the second filtration membrane away from the first filtration membrane; and
      two second oscillators, one of the two second oscillators mounted on an outer surface of the first chamber, another one of the two second oscillators mounted on an outer surface of the second chamber;
   a vacuum system;
   a frequency converting module connected to the first chamber and the second chamber through the vacuum system, the frequency converting module causing the vacuum system to generate negative pressure in the first chamber and the second chamber alternately; and
   a controller configured to control the two first oscillators and the two second oscillators to operate when the vacuum system stops generating the negative pressure in the first chamber; the controller further configured to control the two first oscillators and the two second oscillators to operate when the vacuum system stops generating the negative pressure in the second chamber, wherein each of the two first oscillators and each of the two second oscillators respectively generate a first oscillation wave and a second oscillation wave when operating, a frequency of the first oscillation wave is greater than a frequency of the second oscillation wave, an amplitude of the first oscillation wave is less than an amplitude of the second oscillation wave.

2. The isolation device of claim 1, wherein the frequency of the first oscillation wave is 5000 Hz to 8000 Hz; the frequency of the second oscillation wave is 100 Hz to 500 Hz.

3. The isolation device of claim 2, wherein the frequency of the first oscillation wave is equal to a resonance frequency of the first filtration membrane or the second filtration membrane.

4. The isolation device of claim 1, wherein the two first oscillators and the two second oscillators are located on a same horizontal plane.

5. The isolation device of claim 1, wherein each of the two first oscillators is a harmonic oscillator; each of the two second oscillators is a vibrating motor.

6. An isolation method for isolation and purification of target particles from a liquid sample, comprising:
   providing an isolation chip assembly, the isolation chip assembly comprising:
      an isolation chip comprising a sample reservoir, and a first filtration membrane and a second filtration membrane disposed at opposite sides of the sample reservoir, sizes of pores of each of the first filtration membrane and the second filtration membrane sizes smaller than sizes of the target particles, the isolation chip further comprising a first chamber and a second chamber, the first chamber connected to the sample reservoir through the first filtration membrane, the second chamber connected to the sample reservoir through the second filtration membrane;

two first oscillators, one of the two first oscillators mounted on a surface of the first filtration membrane away from the second filtration membrane, another one of the two first oscillators mounted on a surface of the second filtration membrane away from the first filtration membrane; and two second oscillators, one of the two second oscillators mounted on an outer surface of the first chamber, another one of the two second oscillators mounted on an outer surface of the second chamber;

a vacuum system;

a frequency converting module connected to the first chamber and the second chamber through the vacuum system, the frequency converting module causing the vacuum system to generate negative pressure in the first chamber and the second chamber alternately;

adding the liquid sample to the sample reservoir;

evacuating the first chamber to generate a negative pressure in the first chamber;

stopping vacuuming of the first chamber, and controlling the two first oscillators and the two second oscillators to operate;

evacuating the second chamber to generate a negative pressure in the second chamber; and stopping vacuuming of the second chamber, and controlling the two first oscillators and the two second oscillators to operate, wherein each of the two first oscillators and each of the two second oscillators respectively generate a first oscillation wave and a second oscillation wave when operating, a frequency of the first oscillation wave is greater than a frequency of the second oscillation wave, an amplitude of the first oscillation wave is less than an amplitude of the second oscillation wave.

7. The isolation method of claim 6, wherein the frequency of the first oscillation wave is 5000 Hz to 8000 Hz; the frequency of the second oscillation wave is 100 Hz to 500 Hz.

8. The isolation method of claim 7, wherein the frequency of the first oscillation wave is equal to a resonance frequency of the first filtration membrane or the second filtration membrane.

9. The isolation method of claim 6, wherein the two first oscillators and the two second oscillators are located on a same horizontal plane.

10. The isolation method of claim 6, wherein each of the two first oscillators is a harmonic oscillator; each of the two second oscillators is a vibrating motor.

* * * * *